United States Patent [19]

Fernandez

[11] Patent Number: 4,793,616
[45] Date of Patent: Dec. 27, 1988

[54] GOLF CLUB

[76] Inventor: David Fernandez, 1457 Dara St., Camarillo, Calif. 93010

[21] Appl. No.: 6,002

[22] Filed: Jan. 21, 1987

Related U.S. Application Data

[63] Continuation-in-part of Ser. No. 722,814, Apr. 12, 1985, abandoned, which is a continuation of Ser. No. 568,809, Jan. 6, 1984, abandoned.

[51] Int. Cl.$^4$ ............................................. A63B 53/04
[52] U.S. Cl. ................................. 273/167 H; 273/169
[58] Field of Search .................. 273/DIG. 33, 167 H, 273/167 E, 167 F, 167 J, 167 K, 169, 171, 172, 173, 174

[56] References Cited

U.S. PATENT DOCUMENTS 2,908,502 10/1959 Bradstreet et al. .......... 273/DIG. 33
3,485,703 12/1969 Long ............................ 273/DIG. 33
4,581,190 4/1986 Nagamoto et al. ............. 273/167 H Primary Examiner—George J. Marlo
Attorney, Agent, or Firm—Poms, Smith, Lande & Rose

[57] ABSTRACT

A golf club head including a lightweight composite material molded to a hard, high density material to provide selected distribution and localization of mass within the golf club head. The lightweight composite material provides desirable properties of strength and stiffness to the club head hosel and blade portions while the hard, high density material provides necessary club weight, mass distribution, structure and shape. The use of lightweight composite material in combination with high density material allows placement of the club mass substantially entirely in the blade or head portion to provide enhanced energy transfer. Club heads utilizing ceramic fiber and/or ceramic particles are also disclosed. The club head may include a central foam core surrounded by a rigid shell including resin impregnated fibers and ceramic particles dispersed in the resin.

8 Claims, 3 Drawing Sheets

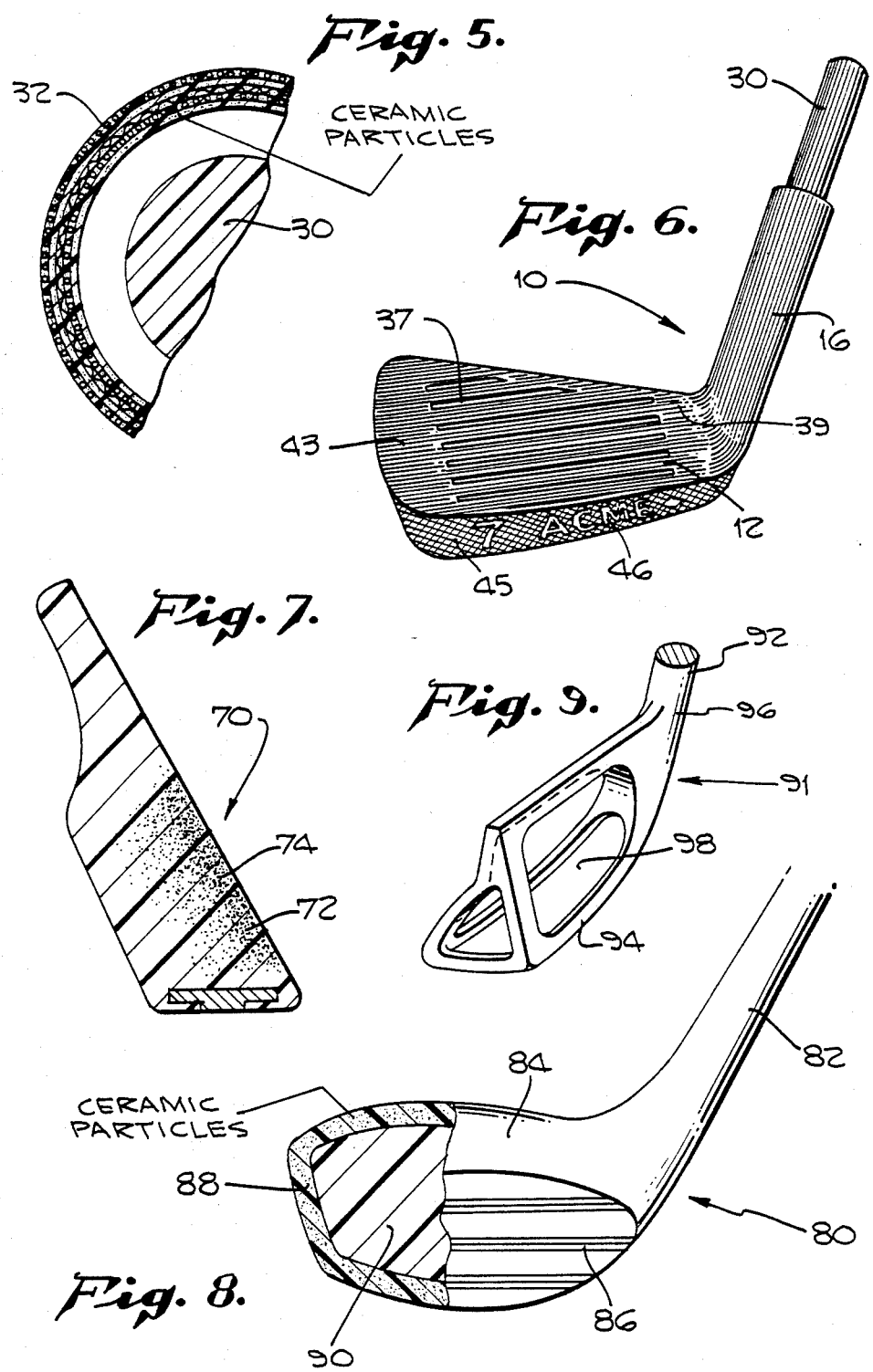

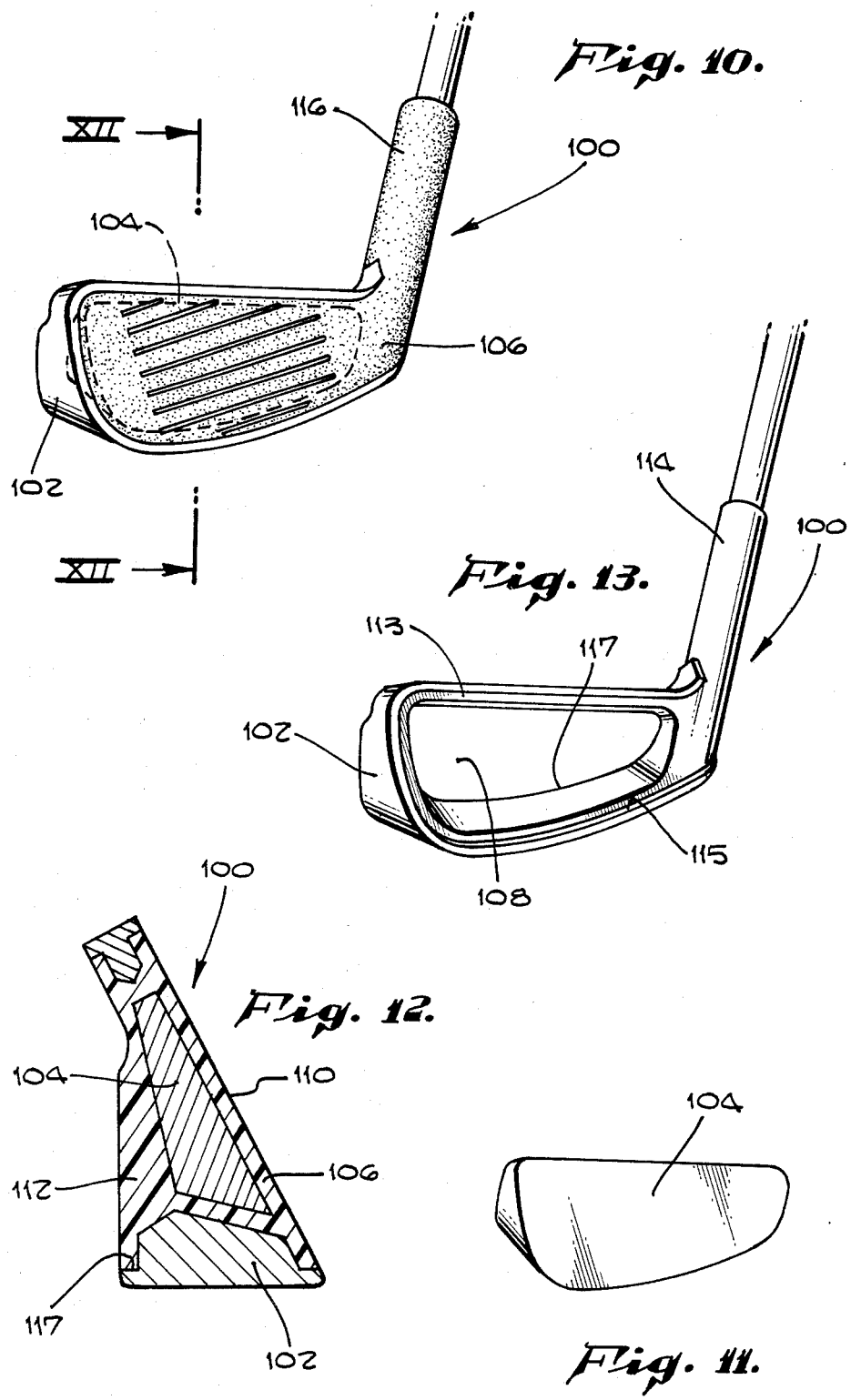

GOLF CLUB

BACKGROUND OF THE INVENTION

The present invention relates generally to golf clubs. More specifically, the present invention relates to an improved "iron" golf club having a high strength composite head. The present application is a continuation-in-part of application Ser. No. 06/722,814 filed on Apr. 12, 1985 which is a continuation of application Ser. No. 06/568,809 filed on Jan. 6, 1984, both are now abandoned.

As is well known, golf clubs are generally of two types. The "wood" or distance clubs and the "irons". "Iron" golf clubs basically include a shaft having a grip portion on one end with a head attached to the other end.

A complete set of "iron" golf clubs typically includes nine clubs numbered one through nine. Additionally, a complete "iron" golf club set will include a sand wedge, a pitching wedge and a putter. As is well known, the numbered clubs one through nine have different shaft lengths and differing blade weights and blade angles to allow a golfer to hit a golf ball different distances using the same swing. The pitching wedge and sand wedge are specialized clubs for use near the green and in sand traps. The putter is used for hitting the ball when on the green.

The head of conventional "iron" golf clubs is typically made from steel or steel alloys such as stainless steel which may or may not be chrome plated. The head may be cast, forged or machined to provide a blade portion which is integral with a hosel or neck portion. The blade portion is used in striking the golf ball. The hosel portion is designed to connect the blade to the club shaft.

The angle of the blade relative to the hosel is varied depending upon the trajectory desired for the golf ball. The loft angle of the blade increases with increasing club number so that the trajectory of the ball increases as the club number increases. The weight of the head also increases with increasing club number.

In making an "iron" golf club head, numerous factors must be taken into consideration. The club should be designed to provide the most efficient transfer of energy to the ball at impact. To achieve such efficient energy transfer it is desirable to place as much of the mass of the club head in the blade portion as is possible. It is also desirable to be able to place and distribute the mass of the blade at desired locations in the blade to optimize energy transfer and provide increased directional control. Fine tuning of the placement and location of the center of the gravity is also highly desirable. It is also desirable that the hosel be connected to the golf club shaft in such a manner to provide a structurally strong connection which minimizes the transfer of shock and head vibration to the club grip.

Although present "iron" golf clubs are well suited for their intended purposes, it is difficult to cast, forge machine and otherwise fabricate steel and steel alloys to provide a club head having all of the above described desirable properties.

SUMMARY OF THE INVENTION

In accordance with the present invention, an improved "iron" golf club head having the above described desirable features is provided. The "iron" golf club head of the present invention is based upon the use of a combination of composite materials such as fiberglass and boron filaments, graphite and ceramic fibers with a high density material such as tungsten. The composite material is formed into a molded shell in the form of the desired golf club head which may be molded to and around a high density insert or core located in the head blade. The high density material in the form of a powder may also be selectively distributed within the composite material at selected locations to provide desired distribution of mass within the blade portion.

The use of composite materials such as boron filaments and graphite fibers in an epoxy matrix allows the molding of a lightweight hosel which is integrally molded and connected to the club head blade which includes the hard, high density material. Although the improved club of the present invention is of the same overall weight as a corresponding "iron" made entirely from steel or other steel alloys, the amount of weight saved in the hosel by using only light composite materials may be placed in the blade of the "iron" by way of the high density material to provide more efficient energy transfer to the ball on impact.

As another feature of the present invention, the use of high strength composite materials allows molding of the hosel to provide a unique internal-external connection to the club shaft. The internal-external connection of the hosel to the shaft improves the structural connection between the club head and club shaft and thereby provides internal shock and vibration dampening. Additionally, the high density material or mass may be placed in more than one strategic area within the high strength composite blade to provide concentrations of mass at various desired locations such as the heel and toe of the blade. Such strategic placement of mass within the molded composite material fiber framework allows fine tuning of energy transfer and directional control.

As another feature of the present invention, the club head may preferably include a lightweight steel shell which is molded into the blade and hosel portion to provide added structural strength.

The above discussed and many other features and attendant advantages of the present invention will become apparent as the invention becomes better understood by reference to the following detailed description when considered in conjunction with the accompanying drawings.

BRIEF DESCRIPTION OF THE DRAWINGS

FIG. 5 is a partial sectional view of FIG. 4 taken in the V—V plane.

FIG. 6 is a bottom perspective view of a preferred composite golf club head in accordance with the present invention.

FIG. 7 is a partial cut-away perspective view of another preferred exemplary composite golf club head in accordance with the present invention.

FIG. 8 is a partial cut-away perspective view of a preferred "driver" type club head in accordance with the present invention.

FIG. 9 is a perspective view of a preferred metal reinforcement shell or frame which can be molded integrally into the club head.

FIG. 10 is a perspective view of an additional exemplary embodiment of a preferred composite golf club head in accordance with the present invention.

FIG. 11 is a perspective view showing the high density insert utilized in the club head shown in FIG. 10.

FIG. 12 is a sectional view of FIG. 10 taken in the X—X plane.

FIG. 13 is a perspective view of the metallic frame portion of the composite club head shown in FIG. 10.

DETAILED DESCRIPTION OF THE INVENTION

The present invention has wide application to sports equipment in general and other apparatus in which a high strength shell of composite material is desired in which a hard high density material in the form of insert(s) or powder is molded to provide required mass distribution. For example, the present invention may be used in fabricating baseball bats to form a bat having a lightweight composite material shell molded to and surrounding one or more hard, high density inserts which are positioned to provide desired mass distribution throughout the lightweight shell structure. Hockey sticks, croquet mallets, and many other club type devices and apparatus may also be made in accordance with the present invention wherein a hard, lightweight composite material is combined with and molded to heavy mass inserts or powder which is distributed at desired locations within the composite material to provide improved club type devices.

Although the present invention has wide application to clubs and club heads in general, it is especially well suited for providing composite "iron" golf club heads which are a substantial improvement over presently existing metal "iron" golf clubs. The following detailed description will be limited to preferred composite "iron" golf clubs and golf club heads with it being understood that the disclosure regarding golf club heads may be applied to a wide variety of club type devices and apparatus. Further, it should also be noted that the present invention has application to "wood" type golf clubs as well.

Figure 1:
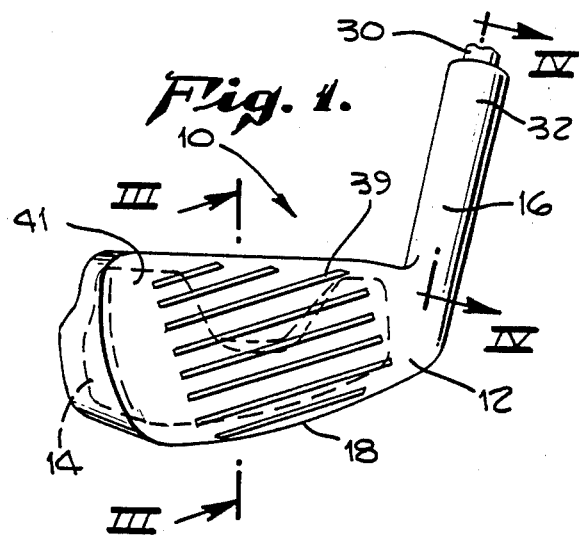
FIG. 1 is a perspective view of a preferred exemplary composite golf club head in accordance with the present invention utilizing a single hard, high density insert or core which is shown in phantom.

A first preferred golf club head in accordance with the present invention is shown generally at 10 in FIG. 1. The club head 10 includes a lightweight composite material shell 12 which is molded to and surrounds a hard high density insert 14. The insert 14 is shown in phantom. The club head 10 includes a neck portion or hosel 16 which is integrally molded to the club head blade 18.

The composite material which forms the rigid club head shell 12 may be made from any of the conventional resin coated composite filamentary materials such as graphite fiber, ceramic fibers, glass fiber, boron filaments, kevlar filaments, or any combination of these filamentary materials. The preferred composite material is graphite fibers either in woven sock-like form or filamentary forms. Particularly well-suited are graphite fibers having a resinous binding material impregnated therein. The resinous binder may be any of the well-known thermoplastic or thermosetting resins conventionally utilized in graphite fiber compositions. It is preferred that thermosetting resins such as phenolic resins, cross-linked polyesters and epoxy resins be used. A particularly preferred graphite fiber composition is Cellion Grade 6000 or Cellion Grade 1200 which is available from the Celanese Corporation and marketed under the name Cellion Graphite Fiber.

Another preferred material is ceramic fibers marketed under the trade name Nextel 312 and available from 3-M Corporation, St. Paul, Minn. Nextel 312 comprises poly-crystalline metal oxide fibers in a resin matrix. Each fiber is composed of aluminum oxide, boron oxide and silicon dioxide. The composition of the polycrystalline metal oxide fibers in Nextel is approximately 52 weight percent aluminum oxide, 14 weight percent boron oxide and 24 weight percent silicon oxide. Other ceramic or polycrystal and metal oxide fibers may also be used if desired.

It is preferred that ceramic particles, such as boron carbide, silicon carbide, aluminum oxide, tungsten carbide or titanium carbide be added to composite material. Preferably, the ceramic particles are incorporated into the resin matrix during fabrication of the club head. The ceramic particles may be added to any of the composite materials including those utilizing graphite fibers, ceramic fibers, glass fibers, boron filaments, kevlar filaments or any combination thereof. It is preferred that the ceramic particles be combined with ceramic fibers. The preferred ceramic particles are silicon carbide particles. The preferred particle sizes range from 40 microns to 275 microns.

For golf club head construction, the graphite fibers are preferably of medium modulus of elasticity. The modulus of these fibers ranges generally from about 30 million to about 40 million pounds per square inch. Although the diameter of the graphite filament may vary, it is preferred that they have an extremely fine diameter on the order of about 0.0003 inch. When an exceptionally high strength and stiffness club head shell 12 is desired, graphite fibers having a high modulus (i.e. 50 million to about 60 million pounds per square inch) may be utilized.

Figure 4:
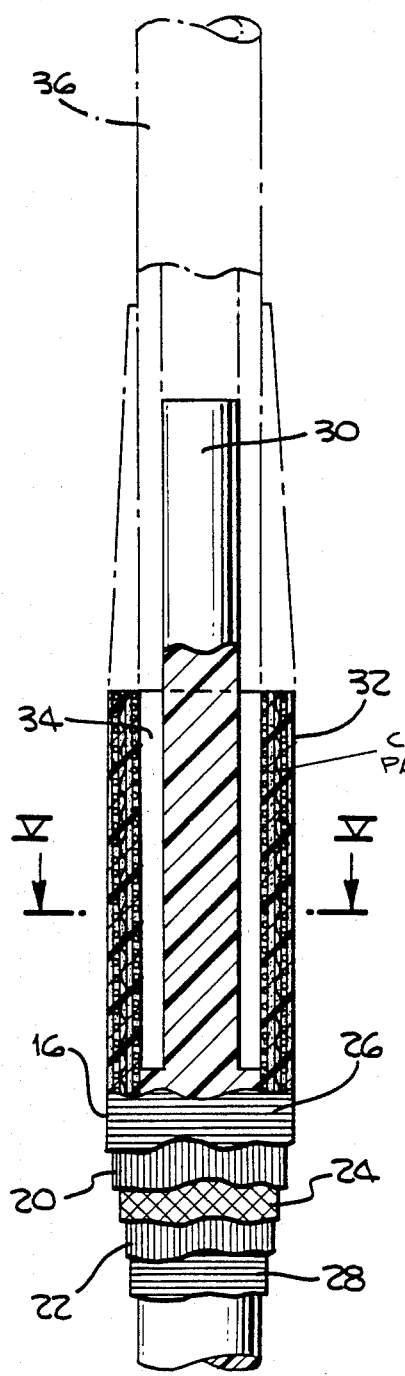
FIG. 4 is a partial sectional view of FIG. 1 taken in the IV—IV plane.

The orientation of the fibers within the composite material shell 12 may be varied to provide a wide variety of fiber layering and arrangements. Preferably, the graphite fibers will be continuous from the hosel 16 onto the blade 18 to provide optimum strength and stiffness to the club head 10. Preferably, one or more layers of resin impregnated fibers are placed parallel to the hosel 16 and curved onto and extend continuously across blade 18 and return back across blade 18 to hosel 16. This provides a continuous layer of filaments which extends throughout the blade 18 to provide an especially strong club head. The number of layers of continuous fibers may be varied to achieve desired head strength and impact resistance. The use of the continuous fiber layers is well suited for "wood" type golf clubs as well as the "iron" type of club. As shown in FIG. 4, two layers 20 and 22 of graphite fibers are parallel to the hosel 16. The two parallel fiber layers 20 and 22 extend down the hosel 16 and are curved onto the blade 18 (not shown) and preferably extend the entire length of blade 18 to provide optimum bending strength and stiffness to the club head 10. Two parallel layers are shown for descriptive purposes with it being understood that numerous layers of parallel fibers will typically be used.

In addition to parallel fiber layers 20 and 22, it is preferred that one or more fiber layers having fibers oriented +45 to the axis of the hosel 16 be provided. The +45° fiber layer is also curved onto and around the blade 18. Such a +45° fiber layer is shown in FIG. 4 at 24. In addition to parallel and +45° fiber layers, it is also desirable to provide one or more layers of resin impregnated fibers which extend circumferentially around the hosel 16. The circumferential fibers provide a hoop configuration with the necessary structure and strength to contain the golf club shaft within the hosel 16. Two such circumferential or hoop fiber layers are shown at 26 and 28 in FIG. 4. Although any number of fiber layers and orientations may be utilized to provide the desired club head stiffness, the fiber layer configuration shown in FIG. 4 is preferred. The composite material generally will include 40 to 45 percent resin binder with the balance of the composite material weight being fiber.

The hosel 16 is preferably molded to provide a shaft connection portion having an upwardly extending shaft mounting stud 30 and a coaxial mounting sleeve 32. The mounting stud 30 and the mounting sleeve 32 are integrally molded during formation of the club 10 so that an annular shaft well 34 is provided for receiving and mounting the golf club shaft 36. The golf club shaft 36 is bonded to the hosel 16 by way of annular shaft well 34 using conventional adhesives well known for use in bonding golf club shafts to golf club heads. The integral molding of mounting stud 30 and mounting stud 32 to provide an internal-external connection of the shaft 36 to hosel 16 provides an improved structural connection between the shaft and hosel which dampens internal shock and vibration during use of the club. This is a substantial improvement over conventional "iron" clubs which only have a mounting sleeve which provides only an external connection of the golf club shaft to the club head.

Figure 2:
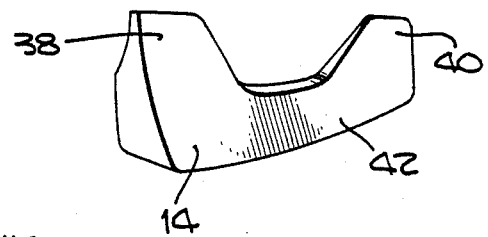
FIG. 2 is a perspective view of a preferred, high density insert for molding within the club head shell of resin-coated high strength composite filaments or fibers.

The exemplary hard, high density insert preferred for use in accordance with the present invention is best shown in FIGS. 1 and 2 at 14. The insert or core 14 may be in any shape or comprise any number of pieces so long as the required club head dimensions, overall weight and weight distribution along with blade angle and shape are provided. In this preferred embodiment, the insert 14 is a one piece hard, high density metal or other material which includes head and heel portions 38 and 40. The head and heel portions 38 and 40 have a higher mass than the central portion 42 to provide distribution of mass to the head 41 and heel portions 39 of the club head blade 18. Other weight distributions and center of gravity placements may be made depending upon individually desired characteristics for the club head.

The hard, high density insert preferably has a density of 0.6 pounds per cubic inch or greater. Materials with densities less than 0.6 pounds per cubic inch are not suitable since the volume of the insert necessary to achieve the desired club head weights would result in an undesirably large club head. When club head size is not a factor or when a lightweight head is desired, other heavy metals such as lead or iron may be used. Materials having a density of 0.6 pounds per cubic inch and greater are preferably used as inserts in combination with the lightweight composite materials to provide a club head which mimics the size, weight and design of conventional "iron" clubs.

Preferred high density materials include tungsten and tungsten alloys, spent uranium and gold. Since the cost and availability of spent uranium and gold make them economically undesirable as insert materials, it is particularly preferred that tungsten and/or tungsten alloys be used as the insert material. Tungsten is an important metal used in many diverse fields and is widely available in five standard types. The standard types are 1 percent thoriated tungsten, one and a half percent thoriated tungsten, two percent thoriated tungsten, pure tungsten and pure non-sag tungsten. In addition, numerous tungsten alloys with copper and nickel are available.

Any of the tungsten and tungsten alloy materials may be utilized to provide suitable inserts. Tungsten alloys with copper and nickel are particularly preferred for forming inserts since the behavior of such alloys for machining and shaping purposes is similar to that of cast iron. Preferably, the tungsten alloys will have from two weight percent to six weight percent copper and five weight percent to nine weight percent nickel with the balance being tungsten. A particularly preferred tungsten alloy is one having four weight percent copper and seven weight percent nickel alloyed with tungsten. This tungsten alloy has a density of 0.62 pounds per cubic foot and has a hardness of 300-370 (as sintered) DPH at 1,000 gm. The tensile strength is typically 100,000 psi with the yield strength being 64,000 psi.

In addition to being sufficiently dense, the insert must also be sufficiently hard. Any material having a hardness of greater than about 250 Vickers hardness number DPH at 1,000 gm may suitably be used. The material should be sufficiently hard so that it is not deformed upon continual impact with golf balls. The insert must also be sufficiently hard to retain its shape to help support the outer lightweight composite material shell.

In addition to solid metal materials, resin impregnated powdered high density materials may also be used. Particularly preferred is powdered tungsten or tungsten alloys which may be impregnated with suitable resin such as the resins used in fabricating composite fibers. Preferably, the resin coated powdered tungsten is placed as a coating around the solid tungsten insert so that during high pressure molding of the lightweight composite material around the solid tungsten insert, a cushioning layer is provided. This cushioning layer is desired to produce an exceptionally smooth and good looking molded composite shell. Although the powdered tungsten layer is not absolutely necessary, it is desirable to prevent blemishes and uneven surfaces in the completed club head.

Preferably, the mass of the club head 10 should be around 80 percent high density material with from 70 to 85 weight percent high density material being possible. The remainder of the club head mass is provided by the light composite shell. Although less than 15 weight percent composite material may be utilized, the structural integrity and stiffness of the club head may be below desired limits when the amount of composite material molded around the high density insert is less than 15 weight percent of the entire club head mass. Preferably, the club head will include from 15 to 30 weight percent lightweight composite material.

A second preferred exemplary embodiment of a club head in accordance with the present invention is shown generally at 70 in FIG. 7. The club head 70 is basically the same as the previously described club head 10 except that instead of utilizing a single high density insert 14, the club 70 utilizes the powdered tungsten as described above as the sole means of providing desired mass and mass distribution to the club head. As can be seen in FIG. 7, the club head 70 incorporates powdered tungsten granules 72 throughout the composite fiber matrix. The concentration or density of powder tungsten in club head 70 is shown being highest adjacent the club face 74 to provide increased mass at the club face. Other powder tungsten distributions are of course possible depending upon the desired mass distribution for the club. For example, the powdered tungsten may be concentrated in the heel and toe of the club (not shown) to provide heel/toe mass distribution if desired. The use of powdered tungsten only is preferred because it allows more accurate distribution of mass at selective locations throughout the club head 70 and additionally makes the molding process simpler and provides a smoother finish than is generally possible when a single or multiple hard relatively large inserts are utilized such as the preferred exemplary embodiments shown in FIG. 1.

The use of powered tungsten or tungsten particles of relatively small size (less than 35 mesh U.S. Standard Screen) is particularly preferred for "driver" golf clubs. An exemplary "driver" type golf club is shown generally at 80 in FIG. 8. The club 80 includes a hosel portion 82, a head portion 84 and a face 86. The club head 82 further includes an outer composite fiber material shell 88 which surrounds an inner foam core 90. The foam core 90 is formed during molding of the club head 80 as is conventionally known utilizing conventional foaming plastics such as polyvinyl chloride.

The orientation of composite fibers in fiber layer 88 is basically the same as previously described for the preferred "iron" type clubs with the same feature of continuous fibers from the driver hosel 82 around head portion 84 and back to hosel 82 being provided. In conventional "driver" type golf clubs, mass distribution and the overall total mass of the club is varied by providing various means for inserting high density material into the head portion of the club. With the present invention, however, the distribution of mass within the driver club head 80 is provided by selectively impregnating the fiber shell 88 with the high density tungsten powder 92. Upon curing of the club head 80 utilizing conventional molding procedures, the high density tungsten powder is molded into and becomes an integral part of the fiber layer 88 to thereby provide an especially convenient means of customizing mass distribution at selected locations throughout club head 88 and to precisely control overall club head weight. Although tungsten powder is the preferred resin impregnated powder for use in this exemplary embodiment, it is possible to utilize less dense metal powders since the mass requirements of the "driver" type head 80 are not as great as for the "iron" type clubs.

As shown in FIGS. 1 and 6, the club head 10 preferably include grooves 37. Grooves are conventionally provided on "iron" club heads to impart spin to the golf ball. The grooves 37 are preferably molded into the club head 10. Additionally, to provide impact and wear resistance, it is preferred that the club head blade face 43 and blade bottom 45 include an impact resistant layer of braided material. The braided material is preferably composed of graphite fibers, kevlar fibers, fiberglass fibers, ceramic fibers, quartz yarn or even more preferably metallic filaments such as stainless steel or metal coated graphite fibers such as CyCom MCG fibers marketed by Cyanamid Corp. Ceramic particles, as previously disclosed, may also be incorporated therein to provide impact and wear resistance.

Figure 3:
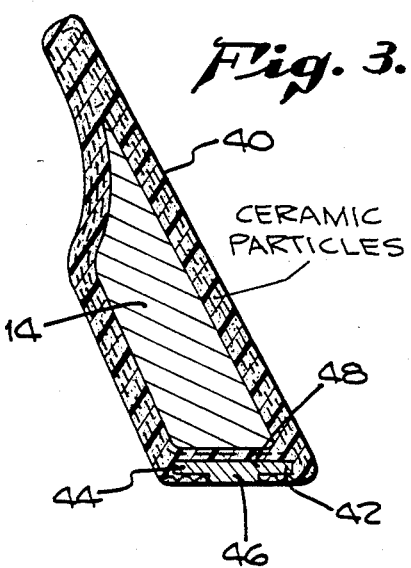
FIG. 3 is a sectional view of FIG. 1 taken in the III—III plane.

The identification of the club head 10 is preferably provided by structurally encapsulating a metal lamination as best shown in FIGS. 3 and 6. The metal lamination 44 includes a raised letter portion 46 which is integral with a metal background support plate 48. The metal lamination 44 is encapsulated between filament layers on the bottom 45 of the blade (or any other desired surface). After molding, only the upper most surface of the letters will be exposed. This provides an especially desirable means for labeling the club head to provide an attractive club head having in-laid numbers, letters or other identification.

In many instances it is desirable to provide added structural reinforcement between the hosel and blade portions of the club head. Preferably, a light weight and strong metal frame or shell 91 is molded as part of the club head. The frame 91 includes a hosel portion 92, a blade reinforcement section 94 and connecting structure 96 between blade section 94 and hosel portion 92. The frame 91 includes an open cavity 98 which allows the placement of the high density inserts within the central areas of the club head.

In the present invention the weight of the iron is controlled by weighing the entire mass placed in the mold, i.e. core, composite material and a light weight steel shell. Weight is provided to produce irons suited for various shaft materials and for various swing weight requirements without altering the shape or adding weight to the "iron". Also, shafts made from different materials, such as steel, titanium, graphite etc. are used with irons and, in order to maintain the proper "swing weight" or balance of the entire club, the weight of the head must be altered. In a normal steel head, weight is removed by sanding the exterior of the iron, thereby altering the shape of the iron. On the other hand if weight must be added, lead particles are placed in the hosel of the iron. These problems are overcome by the present invention since the club head weight can easily be matched to different shaft weights and lengths by simply regulating the weight of high density materials used in mold.

An additional exemplary embodiment of the present invention is shown at 100 in FIGS. 10, 12 and 13. The club 100 includes a metal frame 102, a high density insert 104 and composite material 106.

The metal frame, which is best shown in FIG. 13, includes a central opening 108 into which the high density insert 104 is inserted. The high density insert 104 is held in place within opening 108 by way of the composite material 106. The size and shape of high density insert can be varied to provide desired mass distribution and overall club head weight. The high density insert 104 may be separated into more than one piece of material. It is preferred that the high density material be the tungsten or tungsten alloy materials described previously. It is preferred that the high density insert be formed by resin impregnated powdered tungsten. Combinations of solid inserts and resin impregnated powdered tungsten can be used if desired.

The composite club head shown in FIGS. 10-13 provides an extremely strong yet versatile club head in that strength is provided by metal frame 102 while weight distribution is provided by way of the high density insert 104 which is housed within and completely surrounded by the composite material 106. The composite material 106 forms the face 110 of the club head and also forms the back 112 of the club head as best shown in FIG. 12. Preferably, the composite material not only forms the face and back of the club head 100, but also is wrapped around the hosel 114 of metal frame 102 as shown at 116 in FIG. 10. The composite material may be graphite fibers or any of the other resin impregnated fibers previously described, including the polycrystalline ceramic fibers. In addition, the incorporation of ceramic particles into the composite material 106, especially on the club face 110, is preferred in order to increase the wear and abrasion resistance of the club face.

The metal frame can be made from any of the high strength materials used in fabricating club heads including stainless steel. The metal frame 102 includes a hosel portion 114 and a peripheral frame portion 113. The peripheral frame portion 113 includes channel 115 to allow flush mounting of the composite material with the front edge of the peripheral frame portion 113. Channel 117 is provided in the back of the frame portion 113 to allow flush mounting of the composite material with the back of the frame.

Having thus described exemplary embodiments of the present invention, it should be noted by those skilled in the art that the within disclosures are exemplary only and that various other alternatives, adaptations, and modifications may be made within the scope of the present invention. Accordingly, the present invention is not limited to the specific embodiment as illustrated herein and is only limited by the following claims.

What is claimed is:

1. A golf club head comprising a rigid club head shell wherein said shell comprises resin impregnated fibers and ceramic particles dispersed in said resin.

2. A golf club head according to claim 1 wherein said resin impregnated fibers comprise poly-crystalline metal oxide ceramic fibers.

3. A golf club head according to claim 2 wherein said club head includes a central foam core surrounded by said rigid club head shell and wherein said rigid club head shell is in the shape of a distance club.

4. A golf club head according to claim 2 wherein said poly-crystalline metal oxide ceramic fibers each comprise aluminum oxide, boron oxide and silicon dioxide.

5. A golf club head according to claim 4 wherein said ceramic particles are silicon carbide.

6. A golf club head according to claim 1 wherein said club head includes a central foam core surrounded by said rigid club head shell and wherein said rigid club head shell is in the shape of a distance club.

7. A golf club head according to claim 1 wherein said ceramic particles are selected from the grup consisting of boron carbide, silicon carbide, aluminum oxide, tungsten carbide and titanium carbide.

8. A golf club head according to claim 7 wherein the particle size of said ceramic particles is between about 40 microns to about 275 microns.

* * * * *